United States Patent Office 3,243,407
Patented Mar. 29, 1966

3,243,407
STABILIZED COMPOSITIONS
Yoon Chai Lee, Springfield, Mass., assignor to Monsanto Company, a corporation of Delaware
No Drawing. Filed Mar. 14, 1963, Ser. No. 265,030
14 Claims. (Cl. 260—45.9)

This invention relates to unsaturated nitrile polymers and more particularly relates to the stabilization of such polymers against discoloration.

The presence of a combined unsaturated nitrile, such as acrylonitrile, methacrylonitrile, etc., in a polymer is known to contribute valuable properties to the polymer. However, as is well known, the unsaturated nitrile present in the polymer has a tendency to discolor it, particularly when the polymer is subjected to the elevated temperatures required for molding and extrusion operations.

An object of the invention is to provide novel unsaturated nitrile polymer compositions having a reduced tendency toward discoloration.

Another object is to provide processes for stabilizing unsaturated nitrile polymers against discoloration.

These and other objects are attained by intimately mixing an unsaturated nitrile polymer (i.e., a polymer containing at least 10% by weight of a combined unsaturated nitrile of the group consisting of acrylonitrile, methacrylonitrile, ethacrylonitrile, propacrylonitrile, butacrylonitrile, and mixtures thereof) with at least 0.05%, based on the weight of the polymer, of a stabilizer which corresponds to the formula:

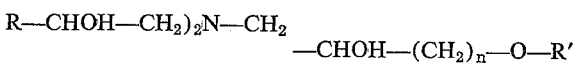

wherein R represents a member of the group consisting of —H and —CH$_3$, R' represents a hydrocarbon radical containing 3–10 carbon atoms and having at least two carbon atoms directly attached to the carbon atom which is attached to the oxygen atom, and $n$ represents an integer of 1–3.

The following examples are given to illustrate the invention. Unless otherwise specified, quantities mentioned are quantities by weight.

EXAMPLE I

Part A—Control

Dissolve about 0.03 part of di-t-butyl peroxide in a monomer mixture consisting of 70 parts of styrene and 30 parts of acrylonitrile. Purge the reaction vessel with nitrogen. Heat the reaction mixture at 125° C. for 3 hours and at 140° C. for 3.5 hours to form a styrene/acrylonitrile copolymer. Age the copolymer at 200° C. for 6 hours.

Part B

Prepare six aged styrene/acrylonitrile copolymers by repeating Part A except for also dissolving varying amounts of 1-phenoxy-3-diisopropanolaminopropan-2-ol (PDIAP) and 2,6-di-t-butyl-p-cresol (DTBPC) in the monomer mixtures, viz.:

| Reaction Number | PDIAP (parts) | DTBPC (parts) |
|---|---|---|
| 1 | 0.05 | 0 |
| 2 | 0.1 | 0 |
| 3 | 0.05 | 0.02 |
| 4 | 0.1 | 0.02 |
| 5 | 0.1 | 0.1 |
| 6 | 0.2 | 0.1 |

Part C

Determine the stabilizing effects of the additives of Part B by (1) dissolving 2 grams of each of the copolymers of Parts A and B in 50 ml. of chloroform, (2) measuring the percentage of light transmitted through each of the solutions at 380 mu, 400 mu, and 420 mu, (3) calculating the stabilizing effects of the additives in accordance with the equations:

$$\text{Stabilizing Effect (380 mu)} = \frac{100(Y-Z)}{Z}$$

$$\text{Stabilizing Effect (400 mu)} = \frac{100(W-X)}{X}$$

$$\text{Stabilizing Effect (420 mu)} = \frac{100(U-V)}{V}$$

wherein Z, X, and V represent the percentages of light transmitted through the solution of the copolymer of Part A at 380 mu, 400 mu, and 420 mu, respectively, and Y, W, and U represent the percentages of light transmitted through a solution of a copolymer of Part B at 380 mu, 400 mu, and 420 mu, respectively, and (4) calculating the average of the three stabilizing effects of each additive. The average stabilizing effects of the additives of Part B are shown below.

| Additive: | Stabilizing effect |
|---|---|
| 0.05 PDIAP | 64 |
| 0.1 PDIAP | 68 |
| 0.05 PDIAP/0.02 DTBPC | 167 |
| 0.1 PDIAP/0.02 DTBPC | 217 |
| 0.1 PDIAP/0.1 DTBPC | 262 |
| 0.2 PDIAP/0.1 DTBPC | 269 |

EXAMPLE II

Part A—Control

Charge 95 parts of water, 51 parts of styrene, 33 parts of acrylonitrile, and about 0.03 part of di-t-butyl peroxide to a suitable, agitated reaction vessel. Pressurize the reaction mixture with nitrogen, heat to 120° C. over a period of about 1 hour, and maintain the temperature at 120° C. for an additional hour. Add a solution of about 0.03 part of a water-soluble acrylic acid/2-ethylhexyl acrylate (93.2:6.8) copolymer and about 0.3 part of sodium sulfate in 5 parts of water. Raise the reaction temperature to 140° C. over a period of about 3 hours, while continuously adding 16 parts of styrene. Maintain the temperature at 140° C. for about 1 hour. Then raise the temperature to 145° C. over a period of about 45 minutes, and maintain the temperature at 145° C. for about 1 hour. Strip the product of unreacted monomer, filter, and then wash and dry the styrene/acrylonitrile copolymer beads.

Part B

Prepare three styrene/acrylonitrile copolymers by repeating Part A except for also including, respectively (1) 0.05 part of 1-phenoxy-3-diisopropanolaminopropan-2-ol (PDIAP) and 0.02 part of 2,6-di-t-butyl-p-cresol (DTBPC), (2) 0.1 part of PDIAP and 0.02 part of DTBPC, and (3) 0.15 part of PDIAP and 0.02 part of DTBPC in the initial charge to the reaction vessel.

Part C

Mold two 0.15 inch-thick specimens of each of the copolymers of Parts A and B. Form Specimen I of each of the copolymers by extruding the copolymer beads at about 205° C. and injection molding the extruded pellets at about 200° C. Form Specimen II of each of the copolymers by extruding the copolymer beads at about 205° C., twice re-extruding at 260° C., and injection molding the extruded pellets at about 200° C. Measure the reflectance of light of each of the specimens at 700 mu, 500 mu, and 420 mu, and calculate the three-point yellowness of the specimen in accordance with the equation:

$$3PY = 2R700 - (R500 + R420)$$

wherein 3PY represents the three-point yellowness value and R700, R500, and R420 represent the reflectances at 700 mu, 500 mu, and 420 mu, respectively.

Part D

Calculate the color stabilizing effects of each of the additives of Part B in accordance with the equations:

$$\text{Stabilizing Effect I} = \frac{100(Y-Z)}{Y}$$

$$\text{Stabilizing Effect II} = \frac{100(W-X)}{W}$$

wherein Y and W represent the respective three-point yellowness values of Specimens I and II of the copolymer of Part A, and Z and X represent the respective three-point yellowness values of Specimens I and II of a copolymer of Part B. The color stabilizing effects of the additives are shown below.

| Additive | Stabilizing Effect I | Stabilizing Effect II |
|---|---|---|
| 0.05 PDIAP/0.02 DTBPC | 22 | 17 |
| 0.1 PDIAP/0.02 DTBPC | 35 | 26 |
| 0.15 PDIAP/0.02 DTBPC | 37 | 32 |

Part E

Calculate the difference between the three-point yellowness values of Specimens I and II of each of the copolymers of Parts A and B. Then determine the heat stabilizing effect of each of the additives of Part B in accordance with the equation:

$$\text{Heat Stabilizing Effect} = \frac{100(Y-Z)}{Y}$$

wherein Y represents the difference between the three-point yellowness values of Specimens I and II of the copolymer of Part A, and Z represents the difference between the three-point yellowness values of Specimens I and II of a copolymer of Part B. The heat stabilizing effects of the additives are shown below.

Additive:                        Heat Stabilizing Effect
- 0.05 PDIAP/0.02 DTBPC _____ 11
- 0.1 PDIAP/0.02 DTBPC _____ 15
- 0.15 PDIAP/0.02 DTBPC _____ 25

As demonstrated in the preceding examples, 1-phenoxy-3-diisopropanolaminopropan-2-ol is effective in stabilizing unsaturated nitrile polymers against discoloration, its effectiveness increases with increases in its concentration, and its effectiveness is enhanced by employing it in conjunction with an alkylphenol. Similar results are observed when:

(1) The stabilizer is intimately mixed with a preformed unsaturated nitrile polymer instead of being incorporated into the monomer charge employed in preparing the unsaturated nitrile polymer, (2) The polymer being stabilized is polyacrylonitrile, polymethacrylonitrile, a styrene/acryonitrile (50:50) copolymer, a styrene/methacrylonitrile (85:15) copolymer, an alpha-methylstyrene/acrylonitrile (80:20) copolymer, a styrene/alpha-methylstyrene/acrylonitrile (50:40:10) terpolymer, or a styrene/acrylonitrile/N-t-butyl acrylamide (70:20:10) terpolymer, (3) The 1-phenoxy-3-diisopropanolaminopropan-2-ol is replaced with 1-phenoxy-3-diethanolaminopropan-2-ol, 1-o-methylphenoxy-3-diisopropanolaminopropan-2-ol, 1-m-ethylphenoxy-3-diisopropanolaminopropan-2-ol, 1-p-t-butylphenoxy-3-diisopropanolaminopropan-2-ol, 1-phenoxy-4-diisopropanolaminobutan-3-ol, 1-phenoxy-5-diisopropanolaminopentan-4-ol, 1-isopropoxy-3-diisopropanolaminopropan-2-ol, or 1-t-butoxy-3-diisopropanolaminopropan-2-ol, or (4) The 2,6-di-t-butyl-p-cresol is replaced with 2,2'-methylene-bis(6-t-butyl-p-cresol), 4,4'-butylidene-bis (6-t-butyl-m-cresol), 2-t-butyl-4-phenylphenol, 2,6-dibenzyl-p-cresol, 2,6-diisopropylphenol, 2-t-butyl-p-cresol, or 2,6-di-t-butyl-hydroquinone.

The polymers which are stabilized in accordance with the present invention are unsaturated nitrile polymers, i.e., polymers containing at least 10% by weight of a combined unsaturated nitrile of the group consisting of acrylonitrile, methacrylonitrile, ethacrylonitrile, propacrylonitrile, butacrylonitrile, and mixtures thereof. Exemplary of such polymers are the homopolymers of these unsaturated nitriles, i.e., polyacrylonitrile, polymethacrylonitrile, etc.; interpolymers of two or more of these unsaturated nitriles, e.g., acrylonitrile/methacrylonitrile copolymers, acrylonitrile/methacrylonitrile/ethacrylonitrile terpolymers, etc.; interpolymers of at least 10% by weight of one or more of these unsaturated nitriles with up to 90% by weight of one or more copolymerizable monomers such as a monovinylidene aromatic hydrocarbon (e.g., styrene; an ar-alkylstyrene such as the o-, m-, and p-methylstyrenes, 2,4-dimethylstyrene, ar-ethylstyrenes, p-t-butylstyrene, etc.; an alpha-alkylstyrene such as alpha-methylstyrene, alpha-ethylstyrene, alpha-methyl-p-methylstyrene, etc.; vinyl naphthalene; and mixtures thereof), an alkyl (alk)acrylate (e.g., methyl acrylate, ethyl acrylate, propyl acrylate, butyl acrylate, 2-ethylhexyl acrylate, the corresponding alkyl methacrylates, etc., and mixtures thereof), an acrylamide (e.g., acrylamide; methacrylamide; an N-alkyl acrylamide such as N-methyl acrylamide, N-butyl acrylamide, etc.; and mixtures thereof), dialkyl maleates and fumarates (e.g., diethyl maleate, dibutyl fumarate, etc., and mixtures thereof), etc. Many other unsaturated nitrile polymers which contain at least 10% by weight of a combined unsaturated nitrile and which present a discoloration problem because of their unsaturated nitrile content will be obvious to those skilled in the art.

A preferred embodiment of the invention is its application to the stabilization of acrylonitrile polymers, particularly monovinylidene aromatic hydrocarbon/acrylonitrile interpolymers containing about 15–50% by weight of combined acrylonitrile. Such interpolymers include those which contain no combined monomers others than acrylonitrile and one or more monovinylidene aromatic hydrocarbons as well as those which also contain a minor amount, e.g., up to about 20% by weight, of one or more combined comonomers such as the alkyl (alk)-acrylate, acrylamide, and dialkyl maleate and fumarate comonomers exemplified above.

The stabilizers of the invention are compounds which correspond to the formula:

$$(R-CHOH-CH_2)_2N-CH_2-CHOH-(CH_2)_n-O-R'$$

wherein R represents a member of the group consisting of —H and —CH$_3$, R' represents a hydrocarbon radical containing 3–10 carbon atoms and having at least two carbon atoms directly attached to the carbon atom which is attached to the oxygen atom, and n represents an integer of 1–3. Such compounds can be prepared by reacting an amine having the formula:

$$(R-CHOH-CH_2)_2NH$$

with an ether having the formula:

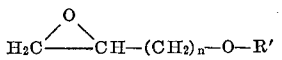

in substantially equimolar proportions, e.g., by heating the amine to about 90–95° C., slowly adding the ether over a period of about 2–3 hours while maintaining the temperature at about 95–100° C., and continuing to maintain the temperature at about 95–100° C. for an additional hour. The stabilizer can be separated from contaminating by-products prior to being used in the practice of the invention, or it can be used in impure form.

Exemplary of the stabilizers of the invention are
1-phenoxy-3-diisopropanolaminopropan-2-ol,
1-phenoxy-3-diethanolaminopropan-2-ol,
1-o-methylphenoxy-3-diisopropanolaminopropan-2-ol,
1-m-ethylphenoxy-3-diisopropanolaminopropan-2-ol,
1-p-t-butylphenoxy-3-diisopropanolaminopropan-2-ol,
1-phenoxy-4-diisopropanolaminobutan-3-ol,
1-phenoxy-5-diisopropanolaminopentan-4-ol,
1-isopropoxy-3-diisopropanolaminopropan-2-ol,
1-t-butoxy-3-diisopropanolaminopropan-2-ol, etc., and mixtures thereof.

At least about 0.05% (based on the weight of the polymer) of the stabilizer is employed in the practice of the invention, and the concentration of stabilizer is usually in the range of about 0.05–5%, preferably about 0.05–1%, based on the weight of the unsaturated nitrile polymer. Higher concentrations of the stabilizer can be used but are not economically attractive; the most desirable concentrations of stabilizer from the standpoints of effectiveness and economics are in the range of about 0.05–0.5%.

The alkylphenols which can be used in conjunction with the stabilizers of the invention are aromatic compounds which have at least one hydroxyl group and at least one alkyl group attached to a benzene nucleus. When used, the alkylphenols are ordinarily employed in concentrations of about 0.01–0.1% based on the weight of the unsaturated nitrile polymer. Up to about 5% of an alkylphenol may be employed when it is mixed with a preformed unsaturated nitrile polymer, but these higher concentrations of alkylphenol are usually undesirable when it is incorporated into a monomer charge which is to be polymerized to form an unsaturated nitrile polymer. Alkylphenols suitable for use in conjunction with the stabilizers of the invention include, e.g.:

2,2'-methylene-bis(6-t-butyl-p-cresol)
2,2'-methylene-bis(6-t-butyl-4-ethylphenol)
2,2'-methylene-bis(4-methyl-6-(1,1,3,3-tetramethylbutyl)phenol)
4,4'-thio-bis(6-t-butyl-m-cresol)
4,4'-butylidene-bis(6-t-butyl-m-cresol)
2,2'-methylene-bis(4,6-dimethylphenol)
2-t-butyl-4-(4-t-butylphenyl)phenol
2-t-butyl-4-phenylphenol
2,6-dibenzyl-p-cresol
2-benzyl-p-cresol
2-benzyl-6-t-butyl-p-cresol
2-benzyl-6-t-butyl-4-ethylphenol
2,4-dimethyl-6-(1-methyl-1-cyclohexyl)phenol
2,6-diisopropyl-p-cresol
2,4-dimethyl-6-isopropylphenol
2-t-butyl-4,6-dimethylphenol
2-t-butyl-p-cresol
2-(1,1,3,3-tetramethylbutyl)-p-cresol
2,4,6-trimethylphenol
2,6-di-t-butyl-p-cresol
2,6-di-t-butyl-4-ethylphenol
2,6-diisopropylphenol
2,6-di-t-butyl-4-phenylphenol
2,6-di-t-butyl-4-(4-t-butylphenyl)phenol
2,5-di-t-butylhydroquinone
2,5-di-t-amylhydroquinone, etc.

The stabilizers of the invention and the alkylphenols, when employed, can be incorporated into the unsaturated nitrile polymers by any technique which permits their uniform distribution throughout the polymers, e.g., by blending them with preformed unsaturated nitrile polymers on a two roll mill or other suitable mixing device, by adding them to the monomer charge which is to be polymerized to form an unsaturated nitrile polymer, etc.

According to a preferred embodiment of the invention, the stabilizer and the alkylphenol, when employed, are added to a polymerizable material containing at least 10% by weight of an unsaturated nitrile, and the polymerizable material is then polymerized by any desired conventional technique, e.g., by heating the polymerizable material at a temperature in the range of about 50–200° C. using a mass, solution, emulsion, suspension, batch, or continuous polymerization technique. In a modification of this preferred embodiment, precursors of the stabilizer, e.g., an amine having the formula:

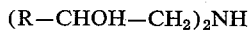

and an ether having the formula:

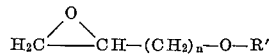

are added to the polymerizable material, which is then heated to polymerize the polymerizable material and form the stabilizer in situ.

When desired, the stabilized compositions of the invention can contain optional additives such as plasticizers, lubricants, colorants, rubbery polymers, etc.

Since the stabilizers of the invention are more effective than many of the compounds which have previously been proposed for use in stabilizing unsaturated nitrile polymers against discoloration, they can be used in sufficiently small amounts to be economically attractive. A particular advantage of the invention is that the novel stabilizers do not prevent the attainment of good conversions of monomer to polymer when they are incorporated into a polymerizable material which is to be polymerized to form an unsaturated nitrile polymer.

It is obvious that many variations can be made in the products and processes set forth above without departing from the spirit and scope of this invention.

What is claimed is:

1. A composition which comprises an unsaturated nitrile polymer selected from the group consisting of (a) homopolymers and interpolymers of combined unsaturated nitriles selected from the group consisting of acrylonitrile, methacrylonitrile, ethacrylonitrile, propacrylonitrile butacrylonitrile and (b) interpolymers containing at least 10% by weight of a combined unsaturated nitrile of the group consisting of acrylonitrile, methacrylonitrile, ethacrylonitrile, propacrylonitrile, butacrylonitrile, and mixtures thereof and up to 90.0% by weight of a copolymerizable monomer selected from the group consisting of monovinylidene aromatic hydrocarbons, alkyl(alk)acrylates, acrylamides, dialkyl maleates, dialkyl fumarates and mixtures thereof, in intimate admixture with at least about 0.05%, based on the weight of the polymer, of a stabilizer corresponding to the formula:

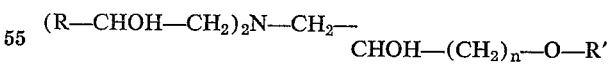

wherein R represents a member of the group consisting of —H and —CH₃, R' represents a hydrocarbon radical having at least two carbon atoms directly attached to the carbon atom which is attached to the oxygen atom and selected from the group consisting of alkyl groups of 3 and 4 carbon atoms, phenyl groups and alkyl-substituted phenyl groups; and $n$ represents an integer of 1–3.

2. The composition of claim 1 wherein the combined unsaturated nitrile is acrylonitrile.

3. The composition of claim 1 wherein the unsaturated nitrile polymer is a monovinylidene aromatic hydrocarbon/acrylonitrile interpolymer containing about 15–50% by weight of combined acrylonitrile.

4. The composition of claim 3 wherein the monovinylidene aromatic hydrocarbon/acrylonitrile interpolymer is a styrene/acrylonitrile copolymer.

5. The composition of claim 3 wherein the monovinylidene aromatic hydrocarbon/acrylonitrile interpolymer is an alpha-methylstyrene/acrylonitrile copolymer.

6. The composition of claim 3 wherein the monovinylidene aromatic hydrocarbon/acrylonitrile interpolymer is a styrene/alpha-methylstyrene/acrylonitrile terpolymer.

7. The composition of claim 1 wherein the stabilizer is 1-phenoxy-3-diisopropanolaminopropan-2-ol.

8. The composition of claim 1 wherein the concentration of the stabilizer is in the range of about 0.05–1%, based on the weight of the polymer.

9. The composition of claim 1 wherein the concentration of the stabilizer is in the range of about 0.05–0.5%, based on the weight of the polymer.

10. A composition which comprises an unsaturated nitrile polymer selected from the group consisting of (a) homopolymers and interpolymers of combined unsaturated nitriles selected from the group consisting of acrylonitrile, methacrylonitrile, ethacrylonitrile, propacrylonitrile butacrylonitrile and (b) interploymers containing at least 10% by weight of a combined unsaturated nitrile of the group consisting of acrylonitrile, methacrylonitrile, ethacrylonitrile, propacrylonitrile, butacrylonitrile, and mixtures thereof and up to 90.0% by weight of a copolymerizable monomer selected from the group consisting of monovinylidene aromatic hydrocarbons, alkyl(alk)acrylates, acrylamides, dialkyl maleates, dialkyl fumarates and mixtures thereof, in intimate admixture with about 0.01–0.1% by weight of an alkylphenol and at least about 0.05% by weight of a stabilizer corresponding to the formula:

(R—CHOH—CH$_2$)$_2$N—CH$_2$—
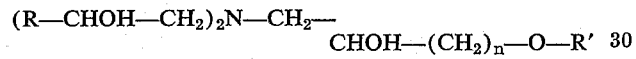CHOH—(CH$_2$)$_n$—O—R' wherein R represents a member of the group consisting of —H and —CH$_3$, R' represents a hydrocarbon radical having at least two carbon atoms directly attached to the carbon atom which is attached to the oxygen atom and selected from the group consisting of alkyl groups of 3 and 4 carbon atoms, phenyl groups and alkyl-substituted phenyl groups, and n represents an integer of 1–3, said alkyl phenol being selected from the group consisting of dialkylated phenols, trialkylated phenols, alkylated and phenylated phenols, alkylidene-bis-phenols, thio-bis-phenols, dialkylated hydroquinones, and dialkyl-monocarbocyclic phenols, and mixtures thereof.

11. The composition of claim 10 wherein the alkylphenol is 2,6-di-t-butyl-p-cresol.

12. A composition which comprises a monovinylidene aromatic hydrocarbon/acrylonitrile interpolymer containing about 15–50% by weight of combined acrylonitrile in intimate admixture with about 0.01–0.1% by weight of 2,6-di-t-butyl-p-cresol and about 0.05–1% by weight of 1-phenoxy-3-diisopropanolaminopropan-2-ol.

13. The composition of claim 12 wherein the monovinylidene aromatic hydrocarbon/acrylonitrile interpolymer is a styrene/acrylonitrile copolymer.

14. A process which comprises dissolving at least 0.05 part by weight of a stabilizer in 100 parts by weight of a polymerizable material selected from the group consisting of (a) unsaturated nitriles of the class consisting of acrylonitrile, methacrylonitrile, ethacrylonitrile, propacrylonitrile, butacrylonitrile and mixtures thereof, and (b) mixtures containing at least 10% by weight of an unsaturated nitrile of the group consisting of acrylonitrile, methacrylonitrile, ethacrylonitrile, propacrylonitrile, butacrylonitrile, and mixtures thereof and up to 90.0% by weight of a copolymerizable monomer selected from the group consisting of monovinylidene aromatic hydrocarbons, alkyl(alk)acrylates, acrylamides, dialkyl maleates, dialkyl fumarates and mixtures thereof, and heating to polymerize the polymerizable material; said stabilizer being a compound which corresponds to the formula:

(R—CHOH—CH$_2$)$_2$N—CH$_2$—
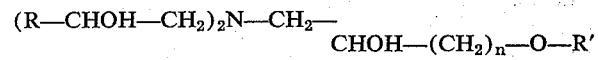CHOH—(CH$_2$)$_n$—O—R' wherein R represents a member of the group consisting of —H and —CH$_3$, R' represents a hydrocarbon radical having at least two carbon atoms directly attached to the carbon atom which is attached to the oxygen atom and selected from the group consisting of alkyl groups of 3 and 4 carbon atoms, phenyl groups and alkyl-substituted phenyl groups, and n represents an integer of 1–3.

No references cited.

LEON J. BERCOVITZ, *Primary Examiner.*

H. E. TAYLOR, *Examiner.*